United States Patent

Huang et al.

(10) Patent No.: US 10,600,261 B2
(45) Date of Patent: Mar. 24, 2020

(54) VEHICLE WITH HEALTH-BASED ACTIVE SELF-TESTING METHOD

(71) Applicant: GM GLOBAL TECHNOLOGY OPERATIONS LLC, Detroit, MI (US)

(72) Inventors: Xiaoyu Huang, Troy, MI (US); Shengbing Jiang, Rochester Hills, MI (US); Wen-Chiao Lin, Rochester Hills, MI (US); Chaitanya Sankavaram, Sterling Heights, MI (US); Yao Hu, Sterling Heights, MI (US); Shiming Duan, Ann Arbor, MI (US); Yilu Zhang, Northville, MI (US); Paul E. Krajewski, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 308 days.

(21) Appl. No.: 15/725,941

(22) Filed: Oct. 5, 2017

(65) Prior Publication Data

US 2019/0108694 A1    Apr. 11, 2019

(51) Int. Cl.
| | |
|---|---|
| *G07C 5/00* | (2006.01) |
| *B62D 5/30* | (2006.01) |
| *G07C 5/08* | (2006.01) |
| *B60W 50/02* | (2012.01) |

(52) U.S. Cl.
CPC ...... *G07C 5/0816* (2013.01); *B60T 2270/406* (2013.01); *B60W 50/0205* (2013.01); *B62D 5/30* (2013.01); *G07C 5/008* (2013.01)

(58) Field of Classification Search
USPC ..................................................... 701/29.1
See application file for complete search history.

(56) References Cited

U.S. PATENT DOCUMENTS

| | | | | |
|---|---|---|---|---|
| 2006/0271255 | A1* | 11/2006 | Stott | G05B 23/0232 701/31.4 |
| 2010/0228423 | A1* | 9/2010 | Howell | G05B 19/0428 701/31.4 |
| 2013/0159240 | A1* | 6/2013 | Singh | G05B 23/0275 706/51 |
| 2013/0184929 | A1* | 7/2013 | Salman | G05B 23/0283 701/31.5 |
| 2013/0218400 | A1* | 8/2013 | Knoop | G06F 17/00 701/31.4 |
| 2016/0070527 | A1* | 3/2016 | Ricci | G06F 3/165 715/716 |

(Continued)

*Primary Examiner* — Tyler D Paige
(74) *Attorney, Agent, or Firm* — Quinn IP Law

(57) ABSTRACT

A method for use with a vehicle having one or more subsystems includes receiving vehicle health management (VHM) information via a controller indicative of a state of health of the subsystem. The VHM information is based on prior testing results of the subsystem. The method includes determining a required testing profile using the testing results, applying the testing profile to the subsystem to thereby control a state of the subsystem, and measuring a response of the subsystem to the applied testing profile. The method also includes recording additional testing results in memory of the controller that is indicative of a response of the subsystem to the applied testing profile. The vehicle includes a plurality of subsystems and a controller configured to execute the method.

18 Claims, 2 Drawing Sheets

(56) References Cited

U.S. PATENT DOCUMENTS

| | | | |
|---|---|---|---|
| 2016/0189115 A1* | 6/2016 | Cattone | G06Q 10/20 705/26.8 |
| 2016/0325754 A1* | 11/2016 | Stahulak | B60W 40/08 |
| 2016/0350194 A1* | 12/2016 | Mohan | G05B 23/0254 |
| 2017/0217419 A1* | 8/2017 | Yen | B60T 7/18 |
| 2017/0345229 A1* | 11/2017 | Huang | G07C 5/008 |
| 2019/0066398 A1* | 2/2019 | Sankavaram | G06Q 50/30 |

* cited by examiner

VEHICLE WITH HEALTH-BASED ACTIVE SELF-TESTING METHOD

INTRODUCTION

Electromechanical systems are constructed from multiple interconnected subsystems, with each subsystem performing one or more dedicated functions. For example, a vehicle may include power steering and braking subsystems, fluid pumps, battery packs, electric machines, actuators, and sensors. Electronic control modules controlling the functionality of a corresponding subsystem are interconnected with each other and a controller via a low-voltage communications network, such as a controller area network (CAN), with the various control modules themselves functioning as distinct subsystems. The controller and/or a server remotely connected to the controller may be used to perform ongoing diagnostic and prognostic routines of the various subsystems using vehicle health management information.

SUMMARY

A method is disclosed herein for active self-testing of a top-level system, i.e., a system having multiple subsystems. For instance, a top-level system within the scope of the disclosure may include an autonomous vehicle or an operator-driven vehicle having a steering system, a braking system, and other subsystems. As used herein, the term "active self-testing" refers to a controller-based process of initiating self-testing diagnostic sequences for the various subsystems, which as set forth herein are targeted using received vehicle health management (VHM) information or, in some instances, operator input.

A goal of the present approach is the gathering of a more comprehensive set of predictive data suitable for estimating a numeric state of health (SOH) of the subsystems and the top-level system as a whole. The method is intended to proactively detect and identify potential health-based performance issues, as well as to improve the robustness and accuracy of automated state of health estimations by conducting specifically-designed diagnostic tests in lieu of passively or opportunistically testing the subsystems as suitable conditions arise. Using the present method, the controller is able to actively diagnose subsystem states of health, including that of redundant subsystems of the type placed on standby during normal vehicle operation.

The method may be adapted for use with a vehicle having one or more subsystems. In an example embodiment, the method includes receiving the VHM information via a controller, with the VHM information being diagnostic and/or prognostic data indicative of an SOH of the subsystem based on past testing results. The method also includes determining a required testing profile using the past testing results, applying the testing profile to the subsystem via the controller to thereby control a logical or dynamic state of the subsystem, and determining a response of the subsystem to the applied testing profile as additional testing results. Thereafter, the method includes estimating the SOH of the subsystem via the controller using the prior and additional testing results, including recording a diagnostic code in memory of the controller when the estimated SOH is less than a threshold SOH.

Determining the testing profile may include receiving a test initiation request from a remote device. The vehicle may include a vehicle telematics unit in some configurations, with the remote device in such an embodiment being a remote server. Receiving the test initiation request may be accomplished via the vehicle telematics unit. The remote device may be configured as a cell phone, with receiving of the test initiation request accomplished via wireless communication between the controller and the cell phone.

Determining the testing profile may include selecting a testing function from a plurality of predetermined testing profiles, e.g., one or more of a step profile, a ramp profile, and a cycles-per-second profile.

The subsystem may be an electrical component, with the step, ramp, or cycles-per-second profiles being, by way of example, an input voltage or an input current controlling an electrical excitation level of the electrical component.

In other embodiments the subsystem may be a hydraulically-actuated component, with the step, ramp, and cycles-per-second profiles controlling a hydraulic pressure level of the hydraulically-actuated component.

A vehicle is also disclosed that includes a plurality of subsystems each performing a corresponding function of the vehicle, and a controller configured to determine VHM information indicative of the SOH of the respective subsystems. The controller is further configured to execute the above-noted method.

The method according to another embodiment includes receiving VHM information via a controller indicative of the SOH of the subsystem, with the VHM information based on past testing results of the subsystem, and determining a required testing profile using the past testing results in response to a test initiation request from a remote device. This includes identifying gaps or under-collected regions of data in the past testing results and selecting the required testing profile from a plurality of predetermined testing profiles based on the identified gaps or under-collected regions, including one or more of a step profile, a ramp profile, and a cycles-per-second profile.

The method further includes applying the testing profile to the subsystem to thereby control a state of the subsystem, including energizing the subsystem according to the testing profile and determining a response of the subsystem to the applied testing profile as additional testing results. Thereafter, the method includes estimating the SOH of the subsystem via the controller using the prior and additional testing results, including recording a diagnostic code when the estimated SOH is less than a threshold low state of health.

The above-noted and other features and advantages of the present disclosure, will be readily apparent from the following detailed description of the embodiment(s) and best mode(s) for carrying out the described disclosure when taken in connection with the accompanying drawings and appended claims.

Figure 1B:
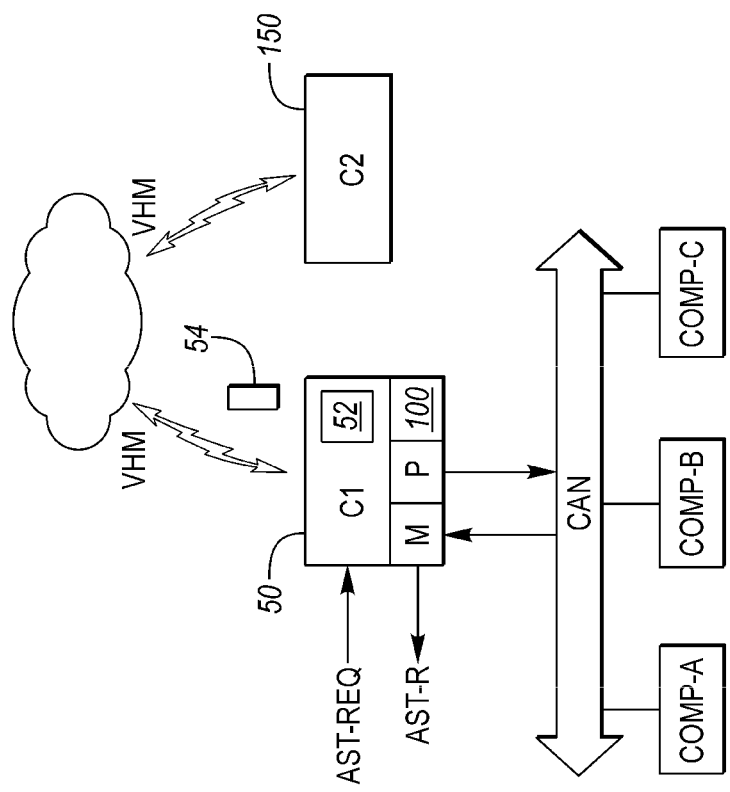
FIG. 1B is a schematic illustration of an embodiment for the controller network shown in FIG. 1A.

The present disclosure is susceptible to various modifications and alternative forms, and some representative embodiments have been shown by way of example in the drawings and will be described in detail herein. Novel aspects of this disclosure are not limited to the particular forms illustrated in the drawings. Rather, the disclosure is intended to cover modifications, equivalents, combinations, or alternatives falling within the spirit and scope of the disclosure as defined by the appended claims.

DETAILED DESCRIPTION

Referring to the drawings, wherein like reference numbers refer to like components throughout the several views, an example vehicle 10 is shown schematically in FIG. 1. The vehicle 10 includes a plurality of subsystems, shown for simplicity in as an example steering system 12 and braking system 14. The vehicle 10 also includes a controller (C1) 50 that is programmed to execute an active self-testing method 100. As part of the method 100, the controller 50 receives vehicle health information (arrow VHM) as diagnostic and prognostic data, including a numeric state of health (SOH) of the steering system 12, the braking system 14, and/or other subsystems of the vehicle 10 subject to the disclosed active self-testing approach. Execution of the method 100, such as the example depicted in FIG. 3, proactively enables active data collection and evaluation of the targeted subsystem(s), thereby expanding upon the range of available data for evaluation as depicted in FIG. 2, and ultimately improving the predictive accuracy of SOH estimations.

The method 100 may be used in lieu of passively collecting test data under normal daily driving conditions. Such passive approaches, which opportunistically gather diagnostic data as an operator happens to execute certain daily driving maneuvers, over time can lead to a collection of diagnostic and prognostic data concentrated in the same limited ranges or zones of operation. For instance, passive collection may collect data that coincides with certain steering or braking forces or sequences to the exclusion of more aggressive or less common maneuvers. Instead, the controller 50 proactively initiates diagnostic/prognostic data collection of targeted subsystems in response to detected gaps or under-collected regions in prior-received vehicle health management (arrow VHM) information and/or in response to an operator request or repair depot request. Such data is referred to herein as past test results, with "past" including data collected over a calibrated number of prior key on/off drive cycles.

A beneficial result of the disclosed approach is the automatic collection of a far more comprehensive data set for use in estimating the SOH of the targeted subsystems and the overall performance of the vehicle 10. For illustrative simplicity, the steering system 12 and the braking system 14 of FIG. 1A will be described hereinafter without limiting the method 100 to the specifically described subsystems. Other subsystems and components may use different parameters in the diagnosis and prognosis of state of health without departing from the intended scope of the method 100.

With respect to the vehicle 10 shown in FIG. 1, the steering system 12 may be optionally embodied as a motor-assisted electronic rack-and-pinion steering system. The steering system 12 in such an embodiment includes a steering wheel 20 coupled to a rack 22 via a steering column 21. Distal ends of the rack 22 are coupled in turn to the front wheels 24 of the vehicle 10 via a set of tie rods. Rotation of the steering wheel 20 turns the front wheels 24, with steering torque applied to the wheel 20 by an operator in an operator-driven vehicle 10 assisted via a steering assist motor 25 or, in other embodiments, by a hydraulic steering pump. Another such steering assist motor 25R may be used in a redundant actuator configuration, such that degradation or failure of the steering motor 25 triggers operation of the steering motor 25R. In autonomous embodiments of the vehicle 10, the steering assist motor(s) 25 may provide the steering torque without accompanying action of an occupant of the vehicle 10.

Although omitted for simplicity, a set of teeth within the rack 22 mesh with mating teeth of a rotating pinion gear mounted on the steering column 21. As a steering angle is imparted to the steering shaft 21 via rotation of a steering wheel 20 and/or action of the steering assist motor 25, the pinion gear translates along the rack 22 via engagement with the rack teeth. In turn, this translation moves the rack 22 and coupled front wheels 24 in a corresponding steering direction.

The example braking system 14 may include a brake pedal 30 to which is applied a pedal force when an operator of the vehicle 10 wishes to slow or stop the vehicle 10, or such an input may be autonomously generated when the vehicle 10 is an autonomous vehicle. In response to the pedal force, a requested braking force may be increased and delivered to the corners of the vehicle 10 via a booster 31 and brake master cylinder 32 and thereafter used to actuate a set of brake actuators 34, e.g., calipers and brake pads for disc brakes or a piston and brake shoes for drum brakes. In some embodiments, braking operation of the vehicle 10 may be assisted via motor torque from an electric machine (not shown) in a regenerative braking process, with energy from such a regenerative braking process used to generate electricity for storage or for powering various components aboard the vehicle 10.

Figure 3:
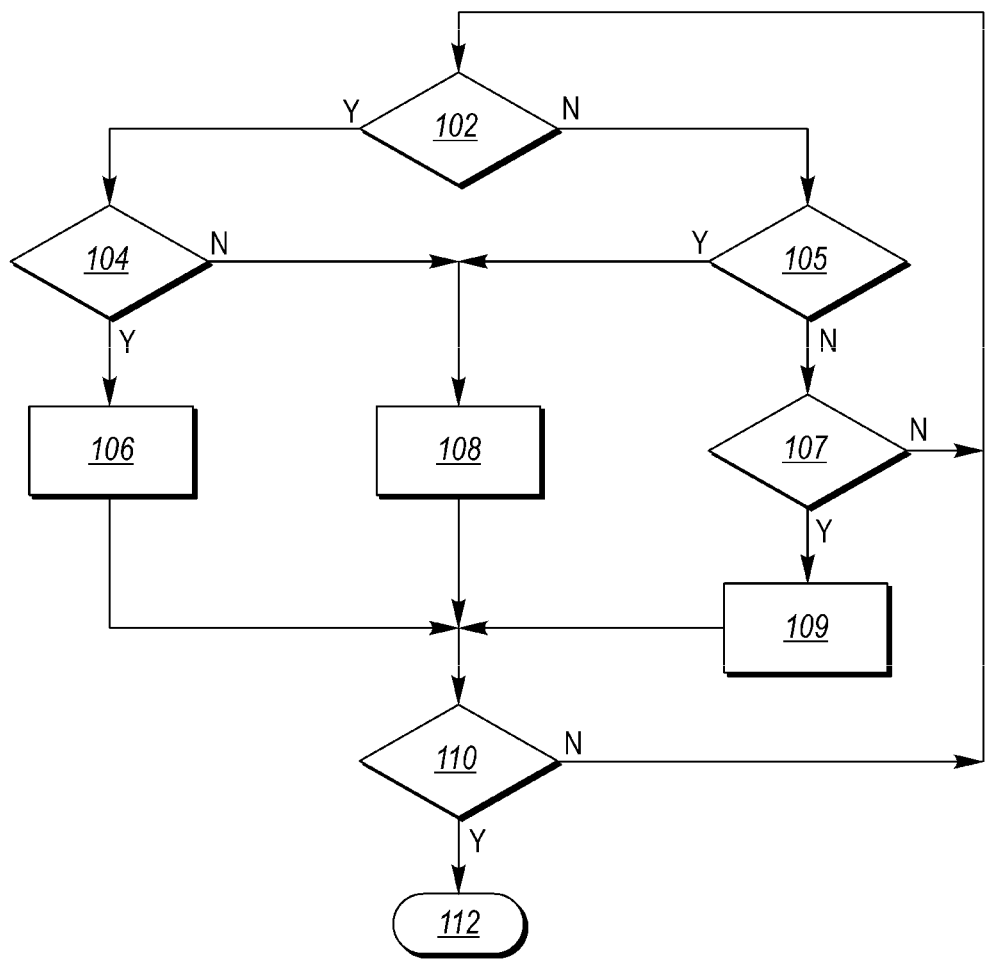
FIG. 3 is a flow chart describing an example method for active self-testing of a subsystem within the vehicle shown in FIG. 1.

The controller 50 may be configured as one or more digital computers or microcomputers, and specially programmed to execute logic blocks of the method 100, an example of which is shown in FIG. 3. To that end, the controller 50 is configured with sufficient hardware to perform the required logical processes, i.e., with sufficient memory (M), a processor (P), and other hardware such as a high-speed clock, analog-to-digital and/or digital-to-analog circuitry, a timer, input/output circuitry and associated devices, signal conditioning and/or signal buffering circuitry. The memory (M) includes sufficient tangible, non-transitory memory such as magnetic or optical read-only memory, flash memory, etc., as well as random access memory, electrically erasable programmable read only memory, and the like.

Figure 2:
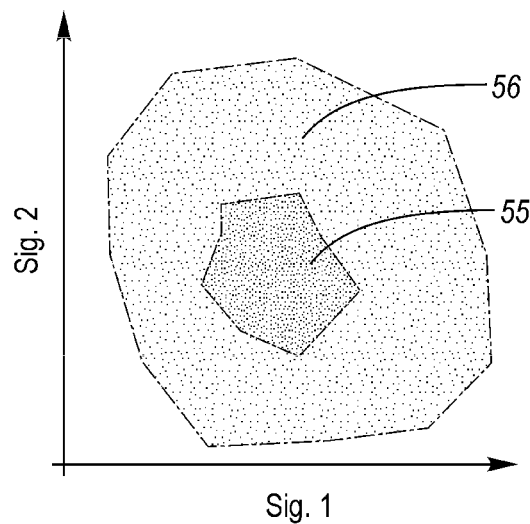
FIG. 2 is a representative signal plot depicting an increase in data coverage of a given component with and without the present methodology.

Referring to FIG. 1B, the controller 50 may be in communication via a telematics unit 52 with a remote device, e.g., a remote server (C2) 150 such as a cloud-connected maintenance or dealership server. The remote server 150 may collect and record the VHM information (arrow VHM) describing the SOH of each of the subsystems of the vehicle 10, and possibly other vehicles in a fleet, with the remote server 150 communicating with the controller 50 or a cell phone/portable device 54, e.g., using text messages or alerts. Thus, as part of ongoing diagnostic and prognostic operation of the vehicle 10, multiple component subsystems (COMP-A, COMP-B, COMP-C), such as but not limited to the steering and braking subsystems 12 and 14 described above, communicate with the controller 50 over a low-voltage CAN bus such that the controller 50 is apprised of the SOH of the subsystems, and/or receives the VHM information (arrows VHM) and calculates the SOH itself.

As part of the method 100, the controller 50 generates or receives an active self-testing request (arrow AST-REQ) requesting a specific testing profile for a targeted subsystem based on gaps or missing/under-collected regions of data in the VHM information. That is, in order to accurately predict the SOH, the controller 50 ideally collects a wide range of subsystem performance data over a range of different operating conditions. Such gaps can result by opportunistically collecting limited data, i.e., as the operator happens to drive the vehicle 10 a certain way or repeats the same driving maneuvers. The controller 50 fills the data gaps by proactively scheduling data collection in the gap areas and thereafter controls a logical or dynamic state of the identified target subsystem(s) according to a selected testing profile, temporarily initiating low-level/localized control of the particular targeted subsystem to perform the active self-testing process.

Once the self-testing sequence is complete, the controller 50 generates and records the active self-testing results (arrow AST-R) corresponding to the executed testing profile, with the recorded additional testing results being indicative of the targeted subsystem's or component's response to the testing profile. Thereafter, the additional testing results are added to past testing results for the subsystem to build a more comprehensive set of VHM information, and to improve the accuracy of resultant state of health estimations.

Referring to FIG. 2, which depicts a cluster of data points coinciding with two different representative data signals (Sig. 1, Sig. 2), e.g., voltage, current, displacement, temperature, etc., the present method 100 seeks to expand upon the universe of available testing data pertaining to the particular subsystem whose state of heath (SOH) is being evaluated. Self-testing data falling in a region 55 may be collected passively without resorting to the present method 100, i.e., under conditions that might naturally arise during normal driving. For example, testing of the braking system 14 of FIG. 1A may automatically initiate when the vehicle 10 is at rest at a stop light, or the steering system 12 may be tested via input from the steering assist motor when an operator is negotiating a winding stretch of roadway or backing out of a driveway.

However, individual drivers tend to repeat certain types of driving behavior over time, e.g., by commuting to and from work or school via the same travel routes, and at the same times of day. Some drivers may routinely execute hard braking maneuvers, or display a preference for traveling on lower speed surface roads, while other drivers may favor higher speed highway driving potentially requiring comparatively less steering or braking. As a result, when diagnosing the SOH of the steering system 12, the braking system 14, or other targeted subsystems, a relatively limited set of diagnostic/prognostic test data may be available.

Accurately predicting the SOH of a given subsystem based on the limited set of data represented by region 55, however, could result in false positive diagnostic results. For example, VHM information collected exclusively during mild or light braking maneuvers may be indicative of the braking system 14 being relatively healthy, while a lower SOH may be predicted if additional diagnostic or prognostic testing data were to be collected over a more comprehensive set of braking conditions, such as during different braking combinations or sequences. Thus, the method 100 expands the scope of region 55 into a wider region 56 through the use of VHM information-based active self-testing.

Figure 1A:
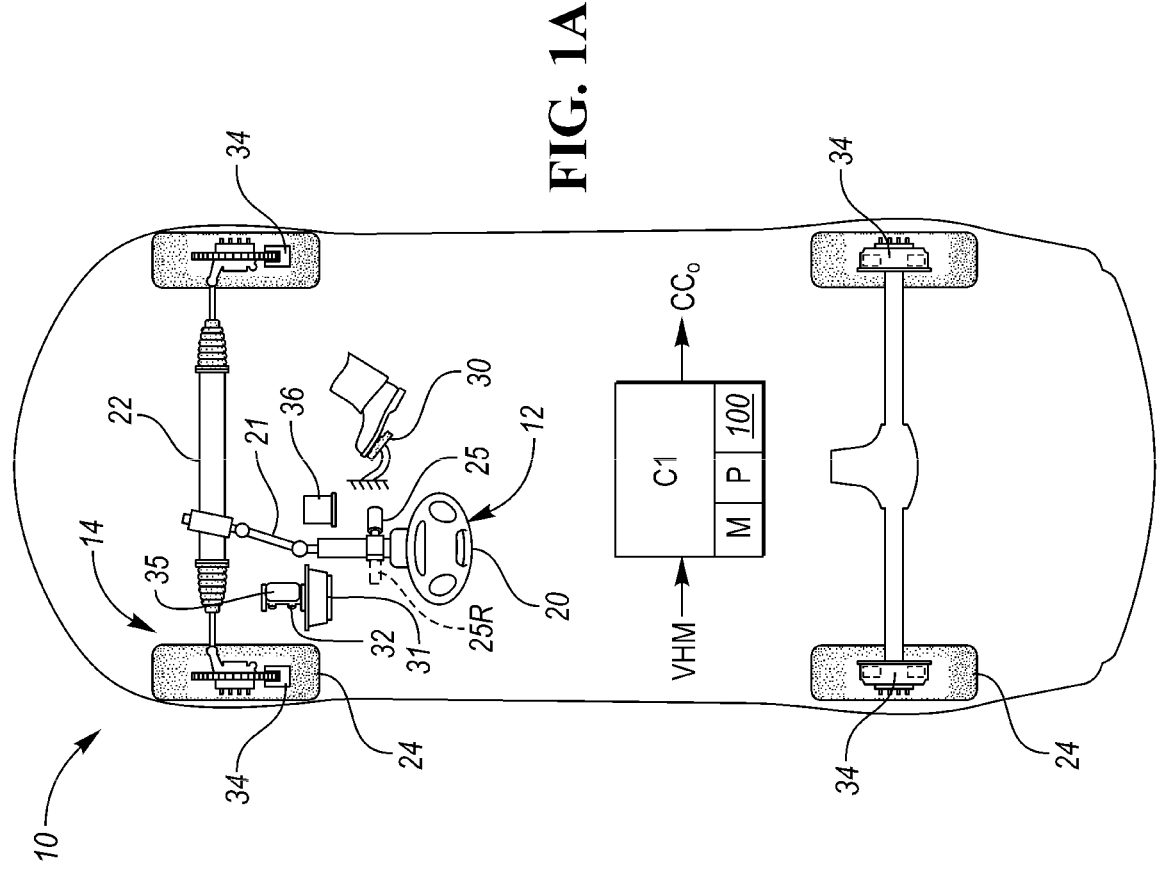
FIG. 1A is a schematic depiction of an example vehicle configured to provide active self-testing of one or more of the vehicle's constituent subsystems.

The method 100 may be programmed into the controller 50 of FIGS. 1A and 1B and used to actively initiate self-testing of the steering system 12, the braking system 14, or other subsystems such as actuators, sensors, batteries, power electronics, etc., or an entire chassis or propulsion system(s) of the vehicle 10. By picking and choosing precisely which data to collect and when to collect it, the controller 50 is able to proactively diagnose potential electrical or mechanical problems well before the SOH of the subsystem has degraded below an allowed minimum threshold.

The method 100 proceeds in five stages: active self-test triggering, selection, evaluation, execution, and analysis. The method 100 may be triggered or activated in response to receipt of the VHM information, such as when the controller 50 or 150 determines that data gaps exist in the VHM information that, if such data were to be collected, would improve the predictive accuracy of resident state of health prognostics. The VHM information could be collected and analyzed remotely from the vehicle 10, such as by the controller 150 of FIG. 1B using the vehicle telematics unit 52 with which the controller 50 remotely communicates with the controller 150 over a wireless network.

In an example scenario in which the vehicle 10 of FIG. 1A is a hybrid electric or battery electric vehicle, low-acceleration ("low-g") braking maneuvers, such as braking maneuvers below 0.2 g, may result in regenerative braking when an electric machine is controlled in a power generating mode. Under such conditions, hydraulic components of the braking system 14 may not be used. If such braking maneuvers are relatively common for a given operator of the vehicle 10, this may lead to a dearth of information about the true health of the braking system during low-g maneuvers.

Alternatively, an operator could initiate additional data collection by requesting or scheduling collection at specific times, such as when aggressively braking or steering. For instance, if an operator perceives a possible fault during certain driving maneuvers that are difficult to duplicate in a maintenance environment, perhaps due to their transient nature, and for which corresponding VHM information does not exist, the operator could affirmatively request collection of VHM information during the maneuver, such as by a touch input to the cell phone/portable device 54 or a touch screen of the controller 50. Thus, the triggering stage of the present method 100 may be an automatically-generated test initiation request based on VHM information or manually-requested by an operator.

The selection stage of the method 100 involves selecting one or more testing profiles, i.e., parameters to which the active self-testing process will conform. The controller 50 or an operator may select from a plurality of predetermined testing profiles, e.g., from a displayed list, which in turn may be prerecorded in memory (M) of the controller 50. Example testing profiles may include a step profile in which a parameter such as voltage or pressure instantly increases to a calibrated level and is held at such a level for a predetermined duration, or a ramp profile in which such a profile increases linearly to a predetermined level at a calibrated rate. Other ramp profiles could be non-linear. The profiles could include a rate-based or cycles-per-second profile, e.g., a sinusoidal signal or other time-varying signal.

An exemplary self-testing profile may include, for instance, braking ten or more times in quick succession, including three hard braking pulses following a particular braking sequence. When evaluating the steering system 12, the profiles could simulate changing lanes three or more times following a particular steering maneuver, or increasing a pump rate from a pumping motor for 5 seconds while maintaining a particular speed profile, etc. Such testing is done when the subsystem is not being otherwise used, e.g., by testing a redundant subsystem which shares some or all of the functions of a primary subsystem or by scheduling the specific test when the vehicle 10 is in service or parked. As a result, the active self-testing does not affect the operator's perceived drive performance.

When the subsystem being self-tested is an electrical subsystem such as the steering motors 25 and/or 25R of FIG. 1A, the testing profiles may represent a commanded input voltage or current to the windings of the electrical component, with the input thereby controlling or regulating the operating state of the electrical component by controlling the excitation level of the electrical component. Using the steering system 14 as an example, the controller 50 of FIGS. 1A and 1B could transition to the redundant steering motor 25R, command a step signal to a steady-state voltage to the steering motor 25 while the steering motor 25 is offline, slowly ramp the voltage, or command a sinusoidal voltage input the steering motor 25, and then measure the rotational response for signs of degraded health before returning operation of the steering function to the steering motor 25.

When the subsystem is a hydraulic component, such as a fluid pump of the braking system 14 of FIG. 1, the testing profiles may be a commanded hydraulic pressure level of the component, with the controller 50 determining the response in a similar manner. The particular testing profile that is used may vary with the age, usage, or other qualities of the tested subsystem. Optimally, the testing profiles will pose a minimal load on the subsystem being tested, and will be designed to expose as many failure modes or latent faults as possible. For tests of redundant components, such as similarly configured brakes disposed at the four corners of the vehicle 10 of FIG. 1 or another steering motor 25 used as a redundant component of the steering system 14, such testing may be less obtrusive or perceptible by the operator, and may be performed without affecting drive performance.

The pre-active self-testing evaluation stage is intended to optimize the testing procedure in terms of time and location so as not to unduly interfere with normal driving. The testing could be scheduled when the vehicle 10 is undergoing routine maintenance or when the vehicle 10 is in use. When in use, particularly when redundant systems or components are being used, the controller 50 may execute the procedure in a manner that is not noticeable by the operator. One example is the automatic application and evaluation of an emergency brake at a stop light when the vehicle 10 is stationary when such a test would not ordinarily be executed or exercising a redundant component when a primary component is actively performing its intended function.

After evaluation, the controller 50 invokes low-level control of the component being tested, such as by commanding the required actions of the selected testing profile(s) from an associated electronic control unit for the subsystem being tested. In the example of the steering system 14, for instance, this may include energizing the steering motor 25 or 25A with a predetermined voltage, or applying the required hydraulic force when testing the braking system. Thereafter, the controller collects the response data and performs diagnostic and prognostic evaluation and associated control actions.

Referring to FIG. 3, the method 100 may be executed at a calibrated interval, such as after a predetermined number of ignition/key-on cycles, or a time or travel distance-based interval. In an example embodiment, the method 100 commences at block 102, wherein the controller 50 of FIG. 1 receives the VHM information indicative of a state of health of a given subsystem, such as but not limited to the steering system 12 or braking system 14 of FIG. 1A. The VHM information is based on past testing results of the particular subsystem being evaluated, such as a response to an input stimulus or testing sequence.

The controller 50 determines a level of degradation of the subsystem using the received VHM information, and may calculate a numeric state of health (SOH) as a number ranging from 0 (failed) to 1 (fully healthy) or a corresponding percentage. The method 100 proceeds to block 104 when the SOH of the subsystem being evaluated is below a threshold, indicating that the subsystem has degraded. The method 100 proceeds in the alternative to block 105 when the SOH remains above such a threshold, i.e., when degradation is not detected.

Block 104 includes determining whether the SOH of the subsystem has degraded below a lower threshold level than block 102, i.e., a threshold indicative of a need for more aggressive testing and evaluation. If so, the method 100 proceeds to block 106. The method 100 otherwise proceeds to block 108.

Block 105, which is reached from block 102 in response to a determination that the subsystem is above a threshold SOH, is used to determine whether a fault or anomaly has been detected, e.g., via existing diagnostic and prognostic algorithms. That is, the controller 50 of FIG. 1 determines whether the otherwise healthy subsystem is experiencing an active fault. If so, the method 100 proceeds to block 108. The controller 50 proceeds instead to block 107 when no such fault is detected.

Block 106 includes setting a code indicative of a need for Level III active self-testing, i.e., an immediate and/or relatively aggressive sequence of testing and data collection. As part of the method 100, multiple levels of active self-testing may be performed, each with a more immediate and proactive nature, with three such levels described herein in ascending order or intensity. Block 106 identifies the particular subsystems or components to be Level III tested and then proceeds to block 110.

Block 107 is reached from block 105 after a determination in respective blocks 102 and 105 that the subsystem is relatively healthy and without an accompanying detected fault. In such circumstances, the method 100 may include determining whether Level I (low priority) active self-testing is required, e.g., based on elapsed time or distance of travel. The method 100 returns to block 102 when Level I active self-testing is not required based on the particular time/distance criteria being applied. The method 100 proceeds to block 109 when the controller 50 determines that time or distance-based Level I active self-testing is required.

At block 108, the controller 50 sets Level II (medium priority) active self-testing in which moderate self-tests are conducted. Thus, blocks 106, 108, and 109 provide three levels of active self-testing, with lower priority levels possibly occurring at operator-scheduled or time/distance-based intervals or locations, or when the operator does not require the vehicle 10, and higher priority levels being automatically scheduled during operation of the vehicle 10, perhaps at a higher level of frequency.

Block 109 includes setting a Level I (low priority) active self-testing flag in memory and then proceeding to block 110.

Block 110 may include determining whether the operator consents to active self-testing and data collection. For instance, the operator may be prompted via a display screen with a message that the operator thereafter acknowledges in order for the method 100 to continue. When the operator provides consent, block 110 may also include collecting additional input from the operator, e.g., a specific time or date during which the operator wishes to collect the required health data, or a specific testing profile that the operator would like to see executed. Such input may be selected by touch input to a display screen, whether of the vehicle 10/controller 50 or the remote device such as a cell phone or web site. The method 100 repeats block 102 when the operator does not provide consent, and to block 112 when such consent is provided.

Block 112 includes selecting a testing function from a plurality of predetermined testing profiles, including, as noted above, one or more of a step profile, a ramp profile, and a cycles-per-second profile in which amplitude or magnitude of a commanded input varies as a sinusoid or according to some other periodic variation, and outputting the selected testing profile to the component being actively self-tested. The method 100 then proceeds by using the controller 50 to measure or otherwise determine a response of the tested subsystem to the applied testing profile as additional testing results, and to record the same in memory (M) of the controller 50. Block 112 may conclude with the controller 50 executing a suitable control action aboard the vehicle 10 in response to the additional testing results, including possibly recording a diagnostic code in memory (M) or elsewhere when the prior and additional testing results indicate that the SOH of the tested subsystem has degraded below a threshold low SOH.

Combining the additional testing results with the prior testing results forming the basis of the VHM information originally received at block 102 provides more comprehensive health data, and thus an increase in the predictive accuracy of the SOH of the evaluated subsystems in subsequent iterations of the method 100, i.e., the method is adaptive. Thus, the method 100 gradually improves the accuracy of SOH estimation efforts through the use of actively targeted and scheduled diagnostic and prognostic data collection in order to fill data gaps or enhance collection of under-collected data underlying the available VHM information.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method for use with a top-level system having a subsystem, the method comprising:
   receiving past testing results in the form of diagnostic and/prognostic data via a controller, wherein the past testing results are indicative of a state of health (SOH) of the subsystem;
   determining a desired testing profile for the subsystem using the past testing results, including identifying gaps or under-collected data regions in the past testing results and selecting the testing profile based on the identified gaps or under-collected data regions;
   commanding, via the controller, an application of the desired testing profile to the subsystem to thereby control a logical or dynamic state of the subsystem;
   determining a response of the subsystem to the applied desired testing profile as additional testing results;
   estimating the SOH of the subsystem via the controller using the past testing results and the additional testing results; and
   recording a diagnostic code when the estimated SOH is less than a threshold SOH.

2. The method of claim 1, wherein the top-level system is a vehicle, and wherein the diagnostic and/prognostic data is vehicle health management information.

3. The method of claim 1, wherein determining the desired testing profile includes receiving a test initiation request from a remote device.

4. The method of claim 3, wherein the top-level system includes a telematics unit, the remote device is a remote server, and receiving the test initiation request is accomplished via the telematics unit.

5. The method of claim 3, wherein the remote device is a cell phone, and receiving the test initiation request is accomplished via wireless communication between the controller and the cell phone.

6. The method of claim 1, wherein determining a desired testing profile includes selecting a testing function from a plurality of predetermined testing profiles, the plurality of predetermined testing profiles including a step profile, a ramp profile, and/or a cycles-per-second profile.

7. The method of claim 6, wherein the subsystem is an electrical subsystem, the step profile, the ramp profile, and the cycles-per-second profile are a profile of an input voltage or an input current to the electrical subsystem, and the logical or dynamic state of the subsystem includes an electrical excitation level of the electrical subsystem.

8. The method of claim 6, wherein the subsystem is a hydraulic subsystem, the step profile, the ramp profile, and the cycles-per-second profile control an input hydraulic pressure to the hydraulic subsystem, and the logical or dynamic state of the subsystem includes a hydraulic pressure level of the hydraulic subsystem.

9. The method of claim 1, further comprising executing a control action aboard the top-level system in response to the additional testing results, including recording another diagnostic code when the recorded additional testing results indicate that the SOH of the subsystem has degraded below the threshold SOH.

10. The method of claim 1, wherein the top-level system is a vehicle and the subsystem is a steering system or a braking system.

11. A vehicle comprising:
    a plurality of subsystems each performing a corresponding function of the vehicle; and
    a controller configured to determine vehicle health management (VHM) information in the form of diagnostic and/prognostic data indicative of a state of health (SOH) of the respective subsystems, the VHM information being based on past testing results of the respective subsystems, wherein the controller is configured to determine the required testing profile by identifying gaps or under-collected regions in the past testing results, and is further configured to:
    select a desired testing profile for a selected one of the subsystems using the past testing results and the gaps or under-collected regions in the prior testing results;
    apply the desired testing profile to the selected subsystem to thereby control a logical or dynamic state of the selected subsystem;
    determine a response of the selected subsystem to the applied desired testing profile;

estimate the SOH of the subsystem using the past testing results and the additional testing results; and execute a control action when the estimated SOH is less than a threshold SOH.

12. The vehicle of claim 11, wherein the controller is configured to determine the desired testing profile by receiving a test initiation request from a remote device, the remote device being a remote server or a portable device.

13. The vehicle of claim 11, wherein the controller is configured to determine the desired testing profile by selecting a testing function from a plurality of predetermined testing profiles, the plurality of predetermined testing profiles including a step profile, a ramp profile, and/or a cycles-per-second profile.

14. The vehicle of claim 11, wherein the selected subsystem is a steering system having an electric steering motor, and the desired testing profile is an applied current or voltage to the steering motor.

15. The vehicle of claim 11, wherein the selected subsystem is a braking system having a braking actuator, and the desired testing profile is an applied hydraulic pressure of the braking actuator.

16. A method for use with a vehicle having a subsystem, the method comprising:

receiving, via a controller, vehicle health management (VHM) information in the form of diagnostic and/prognostic data indicative of a state of health (SOH) of the subsystem, wherein the VHM information is based on past testing results of the subsystem;

determining a desired testing profile using the past testing results in response to a test initiation request from a remote device, including:

identifying gaps or under-collected regions of data in the prior testing results; and selecting the desired testing profile from a plurality of predetermined testing profiles based on the identified gaps or under-collected regions, including a step profile, a ramp profile, and/or a cycles-per-second profile;

applying the selected desired testing profile to the subsystem to thereby control a logical or dynamic state of the subsystem, including energizing the subsystem according to the desired testing profile;

determining a response of the subsystem to the applied desired testing profile as additional testing results; and estimating the SOH of the subsystem via the controller using the past and additional testing results, including recording a diagnostic code when the estimated SOH of the subsystem is less than a threshold SOH.

17. The method of claim 16, wherein the vehicle includes a telematics unit, the remote device is a remote server, and determining the required testing profile includes receiving the test initiation request via the telematics unit.

18. The method of claim 16, wherein the subsystem is a steering system or a braking system.

* * * * *